United States Patent
Scheffler

(10) Patent No.: US 9,481,062 B2
(45) Date of Patent: Nov. 1, 2016

(54) METHOD AND APPARATUS FOR CHANGING TOOLS

(71) Applicant: René Scheffler, Leipzig (DE)

(72) Inventor: René Scheffler, Leipzig (DE)

(73) Assignee: EMAG HOLDING GMBH, Salach (DE)

(*) Notice: Subject to any disclaimer, the term of this patent is extended or adjusted under 35 U.S.C. 154(b) by 321 days.

(21) Appl. No.: 14/329,901

(22) Filed: Jul. 12, 2014

(65) Prior Publication Data

US 2015/0018179 A1    Jan. 15, 2015

(30) Foreign Application Priority Data

Jul. 13, 2013  (DE) .................... 10 2013 011 760

(51) Int. Cl.
*B23Q 3/155*     (2006.01)
*B23Q 39/02*     (2006.01)
(Continued)

(52) U.S. Cl.
CPC ......... *B23Q 3/15573* (2013.01); *B23Q 3/1554* (2013.01); *B23Q 3/15513* (2013.01); *B23Q 3/15526* (2013.01); *B23Q 3/15773* (2013.01); *B23Q 39/026* (2013.01); *B23B 3/167* (2013.01); *B23Q 39/022* (2013.01); *B23Q 39/025* (2013.01); *B23Q 2003/15586* (2013.01); *B23Q 2039/004* (2013.01); *B23Q 2039/008* (2013.01);
(Continued)

(58) Field of Classification Search
CPC ................. Y10T 483/1714; Y10T 483/1719; Y10T 483/1721; Y10T 483/1724; Y10T 483/10; B23Q 3/15573; B23Q 3/15773; B23Q 3/15513; B23Q 2003/15586
USPC ..................... 483/22, 24, 25, 26, 1
See application file for complete search history.

(56) References Cited

U.S. PATENT DOCUMENTS 7,229,397 B2    6/2007 Hagmann
2006/0189464 A1*  8/2006 Corbean ............ B23Q 3/15533
                                                483/63
(Continued)

FOREIGN PATENT DOCUMENTS

JP       54-005278 A  *  1/1979
JP       63-074507 A  *  4/1988
JP       63-134146 A  *  6/1988

OTHER PUBLICATIONS

Machine Translation JP 63-134146-A, which JP '146 was published Jun. 1988.*
Machine Translation JP 63-074507 A, which JP '507 was published Apr. 1988.*

*Primary Examiner* — Erica E Cadugan
(74) *Attorney, Agent, or Firm* — Andrew Wilford

(57) ABSTRACT

A machining apparatus has a frame, a magazine holding a plurality of tools, a loader capable of moving the tools between the magazine and a primary transfer position, first and second tool holders each displaceable horizontally and vertically on the frame, and a transfer arm carrying a grab. Each of the tool holders can move into and out of a respective secondary transfer position for switching a tool, one of the tools is removed from the magazine with the loader and moved by the loader into the primary transfer position, then the one tool is transferred position to the grab of the transfer arm. This arm is them pivoted to move the one tool in the grab from the primary transfer position into one of the secondary transfer positions, and then the tool at the one secondary transfer position is transferred from the grab to the respective holder.

8 Claims, 7 Drawing Sheets

(51) Int. Cl.
  *B23B 3/18*    (2006.01)
  *B23Q 3/157*   (2006.01)
  *B23B 3/16*    (2006.01)
  *B23Q 39/00*   (2006.01)

(52) U.S. Cl.
  CPC ........... *Y10T 82/2506* (2015.01); *Y10T 483/10* (2015.01); *Y10T 483/1714* (2015.01); *Y10T 483/1719* (2015.01); *Y10T 483/1721* (2015.01); *Y10T 483/1724* (2015.01)

(56) References Cited

U.S. PATENT DOCUMENTS

| | | | |
|---|---|---|---|
| 2007/0184954 A1* | 8/2007 | Muser | B23Q 3/15526 483/1 |
| 2009/0209398 A1* | 8/2009 | Yoshida | B23Q 3/15713 483/18 |
| 2010/0145498 A1* | 6/2010 | Uchikawa | B23Q 17/22 700/179 |
| 2011/0107573 A1* | 5/2011 | Fujioka | B23B 29/04 29/27 A |

* cited by examiner

METHOD AND APPARATUS FOR CHANGING TOOLS

FIELD OF THE INVENTION

The present invention relates to a machining apparatus. More particularly this invention concerns a method and apparatus for changing tools in such a machining apparatus.

BACKGROUND OF THE INVENTION

A tool changer for a machining apparatus moves a machining tool such as a lathing or drill bit from a tool holder or magazine to the chuck of a machining spindle that can engage it with a workpiece and do a lathing, milling, drilling, or other machining operation, all under automatic computer control. In U.S. Pat. No. 7,229,397 the tool changer has two tool holders and a separate magazine holding a number of tools, and the tool changer moves tools one at a time from the magazine to one or the other of the holders and takes tools from the holders and puts them back in the magazine. Four pass-through or transit stations are provided where the tools can be temporarily held when moving in from the magazine to the tool holder or out from the tool holder back to the magazine. The various grabs are carried on slides and move with them. Each transit station has a holder in which a workpiece can be temporarily held, with actuators for locking a tool in the holder and releasing it therefrom.

OBJECTS OF THE INVENTION

It is therefore an object of the present invention to provide an improved machining apparatus and method of changing tools therein.

Another object is the provision of such an improved machining apparatus and method of changing tools therein that overcomes the above-given disadvantages, in particular that improves the handling procedure.

SUMMARY OF THE INVENTION

Thus the instant invention is a method of operating a machining apparatus having
  a frame,
  a magazine holding a plurality of tools,
  a loader capable of moving the tools between the magazine and a primary transfer position,
  a chuck on the frame, adapted to hold a workpiece, and rotatable on the frame about a workpiece axis,
  a drive spindle for rotating the chuck about the workpiece axis,
  first and second tool holders each displaceable horizontally and vertically on the frame, and
  a transfer arm carrying a grab.
The method according to the invention comprises the steps of sequentially
  a) supporting each of the tool holders for movement into and out of a respective secondary transfer position,
  b) removing one of the tools from the magazine with the loader and moving the one tool by the loader into the primary transfer position,
  c) transferring the one tool in the first transfer position to the grab of the transfer arm,
  d) pivoting the arm to move the one tool in the grab from the primary transfer position into one of the secondary transfer positions, and
  e) transferring the tool at the one secondary transfer position from the grab to the respective holder.

The loader is of the 3-axis type so that, no matter what the orientation of the tool in the magazine is, it can be set in the required orientation into the holder.

What is more, according to the invention, the grab of the arm is a double grab shiftable on an outer end of the arm. Thus, during step c) the one tool is transferred to one of the grabs of the double grab and an other grab of the double grab is left empty. The method therefore further has according to the invention between steps d) and e) the steps of
  $d_1$) gripping a tool in the holder in the one secondary transfer position with the empty other grab,
  $d_2$) releasing the gripped tool from the holder in the one secondary transfer position,
  $d_3$) shifting the holder in the one secondary transfer position away from the gripped tool,
  $d_4$) moving the double grab to move the other grab and the gripped tool out of the one secondary position and to move the one grab with the one tool into alignment with the holder in the one secondary transfer position,
  $d_5$) shifting the holder in the one secondary transfer position toward the one tool held by the one grab to fit it to the holder of the one secondary transfer position,
  $d_6$) gripping the one tool with the holder of the one secondary transfer position, and
  $d_7$) releasing the one tool from the one grab.

Thus in accordance with this invention the movements of both the grab and the holder are fairly simple and allow fast transfer of a tool that is no longer needed to the grab and then loading of the next needed tool into the same holder. All of this is controlled centrally by the computer serving as controller.

The double grab according to the invention is pivoted about an axis on a free end of the arm. Thus once the no-longer-needed tool in the holder has been gripped by the one grab, the holder backs off, and the double grab is swung around through 180° to align the new tool in the other grab and the holder is moved back in a straight line, vertically or horizontally, to fit to and then grip this one tool. The grab then releases this one tool and can then return the no-longer-needed tool to the loader for return to the magazine.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
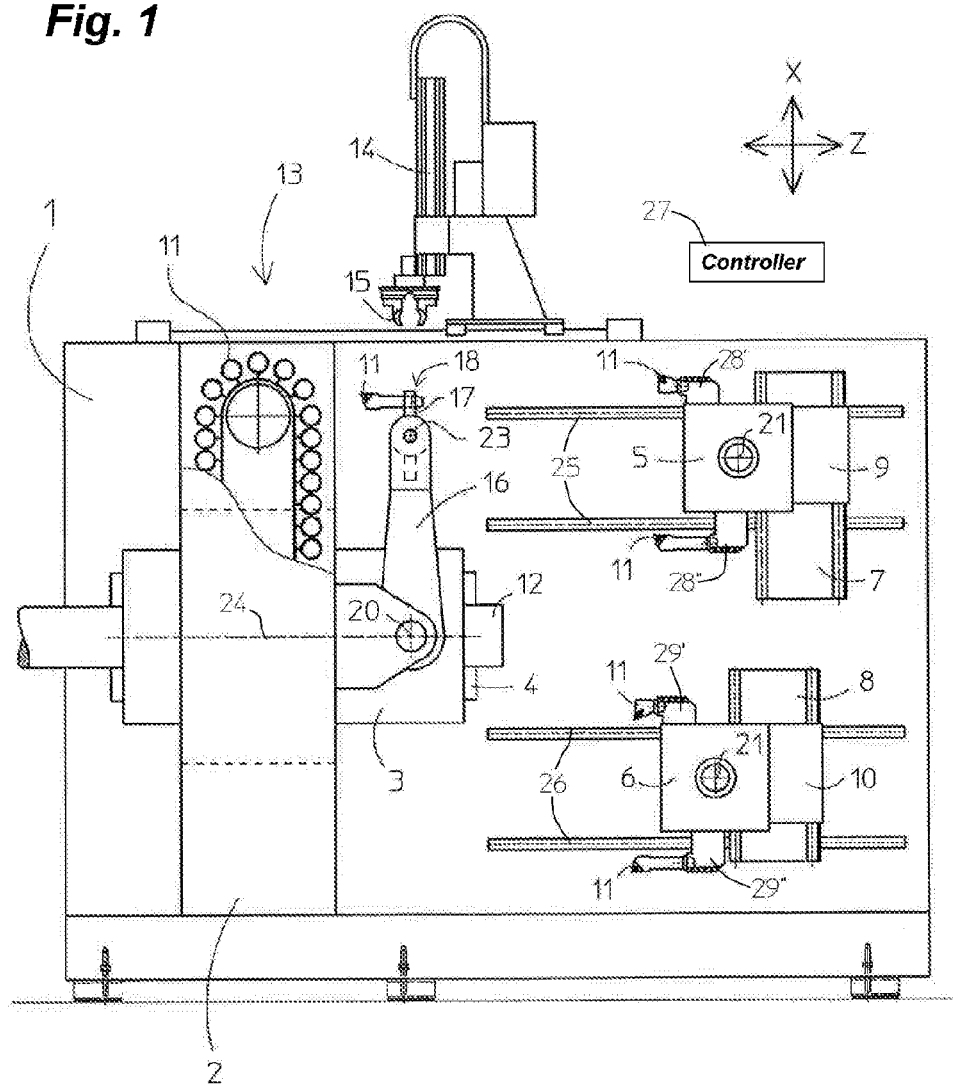
FIG. 1 is a partly schematic side elevational view of a machining apparatus with a tool changer according to the invention.

As seen in FIG. 1, a machining apparatus has a frame 1 with a vertical front wall 2 on which is mounted a main spindle drive 3 that rotates a chuck 4 adapted to hold a workpiece 12 for rotation about a horizontal axis 24 extending in a direction Z. Two tool holders 5 and 6 are provided that are carried on respective slides 9 and 10 displaceable in a vertical direction X on respective slides 7 and 8 horizontally displaceable on horizontal rails 25 and 26 extending in the Z-direction on the front wall 2. The holders 5 and 6 are pivotal or rotatable on the respective slides 9 and 10 about vertically offset horizontal axes 21 extending in an unillustrated horizontal Y-direction perpendicular to the vertical and horizontal X- and Z-directions.

Figure 4:
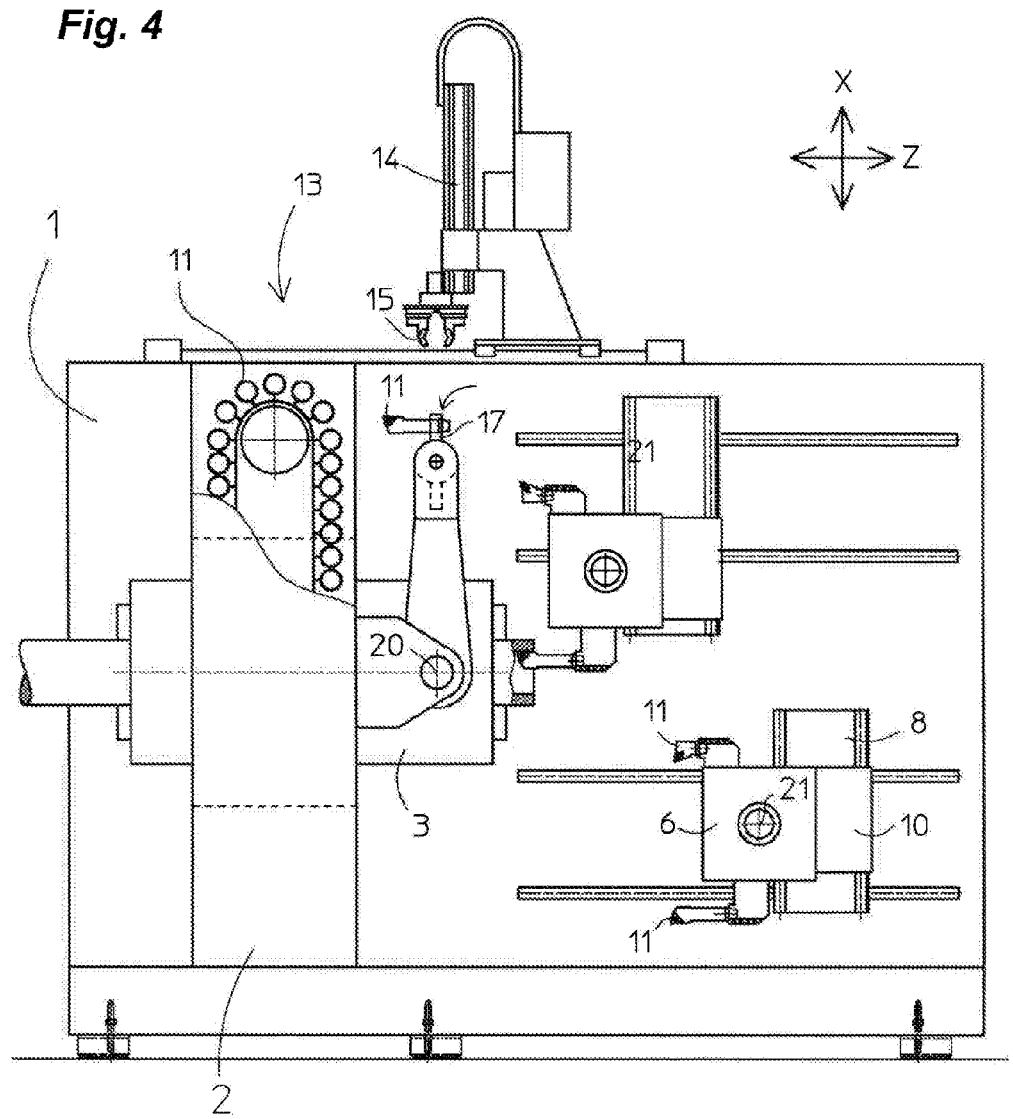
FIGS. 4 and 5 are detail views showing the machine in two different machining positions.
Figure 5:
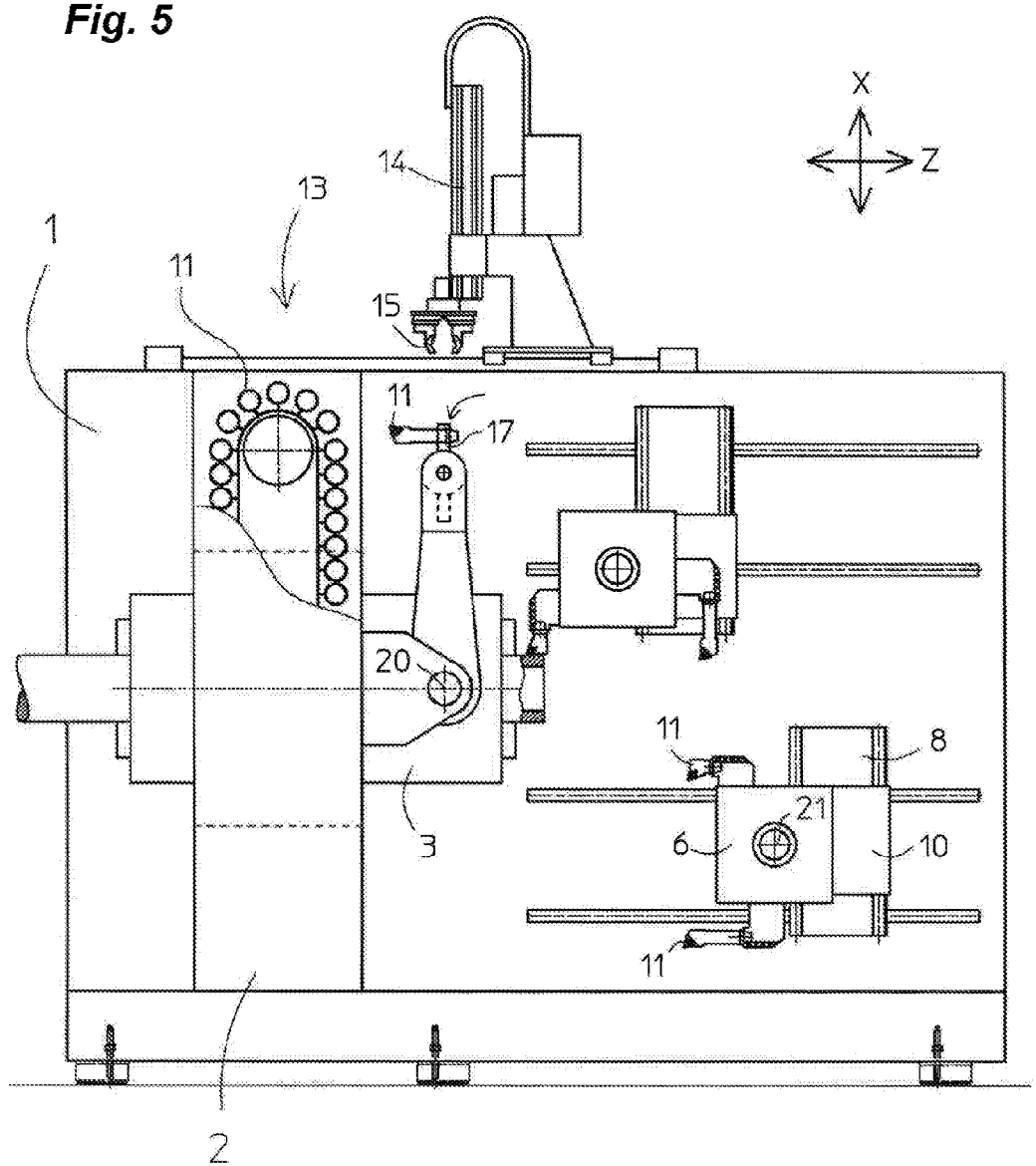
Figure 6:
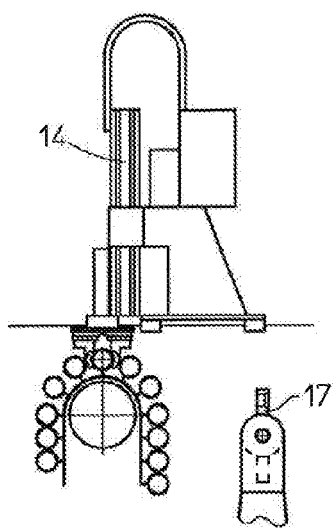
FIGS. 6 through 13 show the steps executed by the machine during transfer of a tool.
Figure 7:
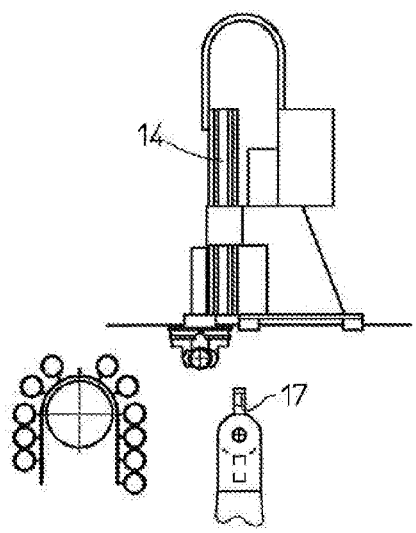
Figure 8:
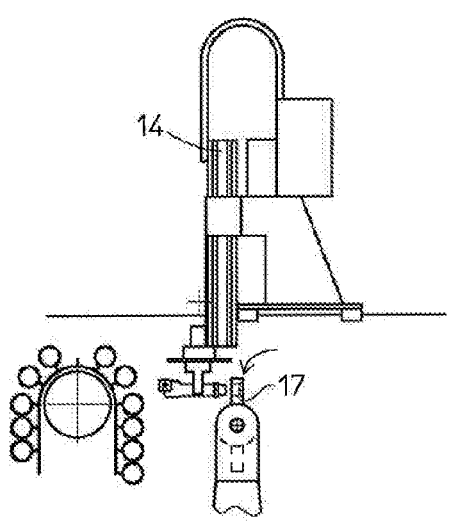
Figure 9:
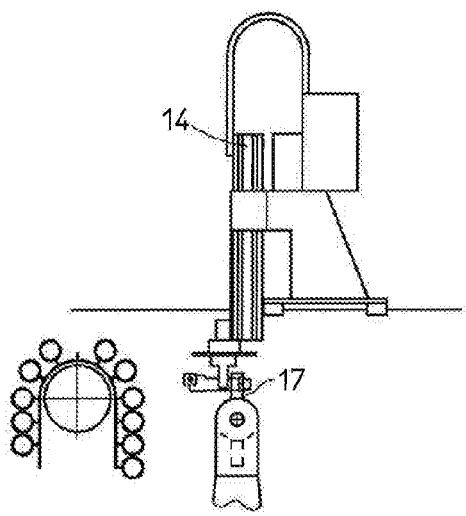
Figure 10:
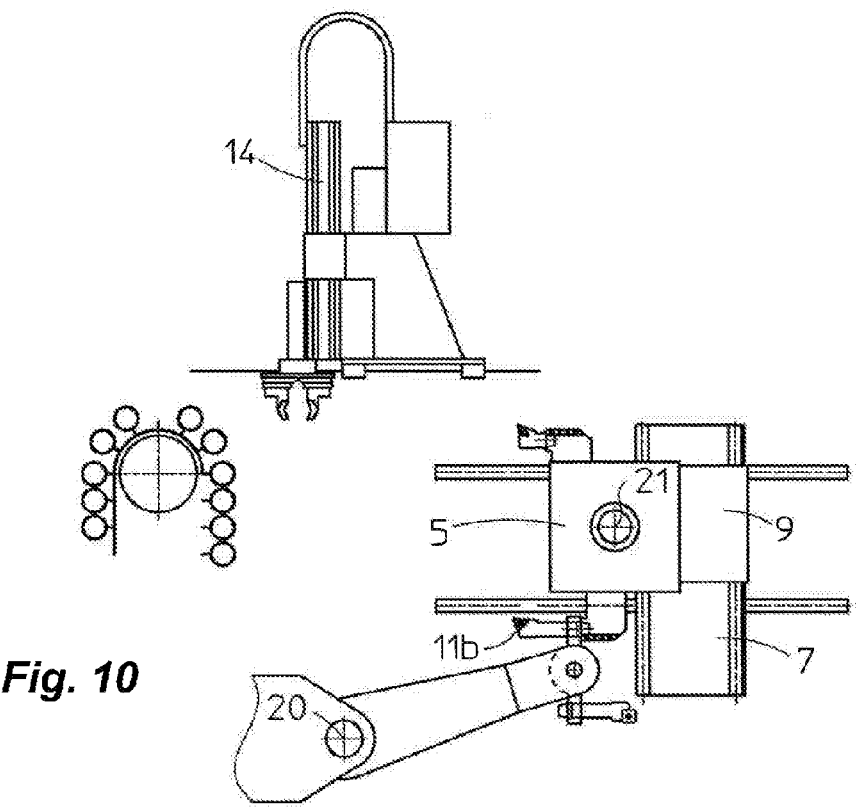
Figure 11:
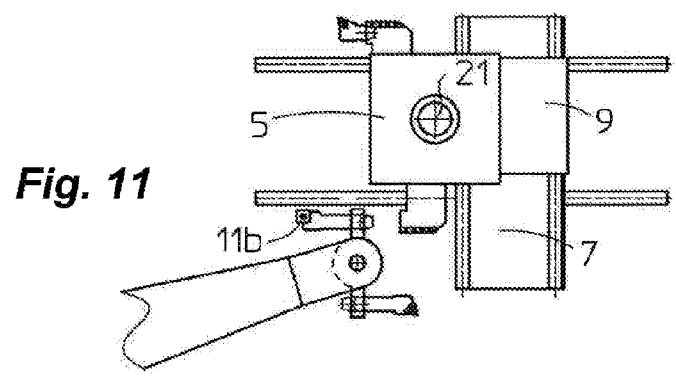
Figure 12:
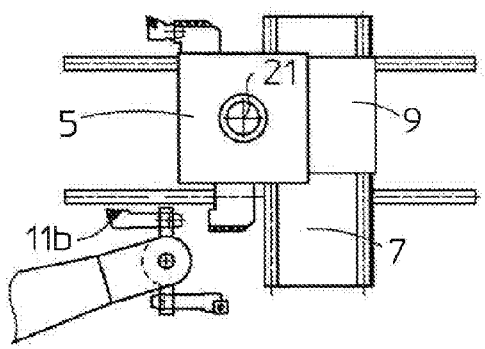
Figure 13:
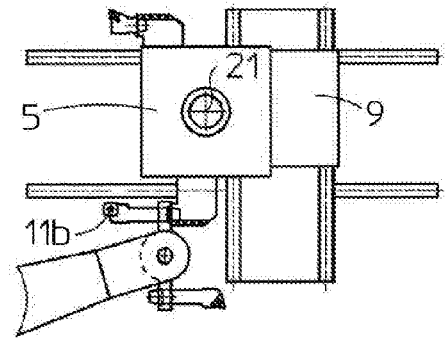

Respective unillustrated actuators and servomotors forming part of and operated by a central controller 27 move the holders 5 and 6 vertically and horizontally and rotate them about the respective axes 21. The holders 5 and 6 are provided with standardized DIN 69893, ABS tool sockets or chucks 28', 28" and 29', 29" of the HSK type market by Komet or Capto von Sanvik-Coromant for automated operation so that the holders 5 and 6 so that they can each hold two tools 11 extending parallel to each other along respective axes extending tangentially of and symmetrically flanking the respective axes 21. These tools 11 can be positioned by the holders 5 and 6 holding them in respective transfer positions 19 and 19*a* (FIGS. 2 and 3) lying between the holders 5 and 6. FIGS. 4 and 5 illustrate how the tools 11 can be used to machine the inside and outside of an annular or short tubular workpiece 12 by moving about the axis 21 between 90° offset positions.

A multiplicity of the tools 11 for different machining purposes are carried in a chain- or belt-type recirculating magazine 13. A loader 14 has a grab 15 that can move in all three X-, Y-, and Z-directions between an outer transfer position 18 between the magazine 13 and the holders 5 and 6.

Laterally next to the main drive 3 is a transfer arm 16 having an inner end pivoted about a horizontal Y-direction axis 20 equispaced between the stations 19 and 19*a* and the holders 5 and 6 and carrying on its outer end two tool grabs 17 pivotal about an axis 23 parallel to the axis 20 and each capable of taking a tool 11 from or handing a tool 11 to the grab 15 in the transfer station 18. Here the axis 20 lies in a common horizontal plane with the workpiece axis 24.

Figure 2:
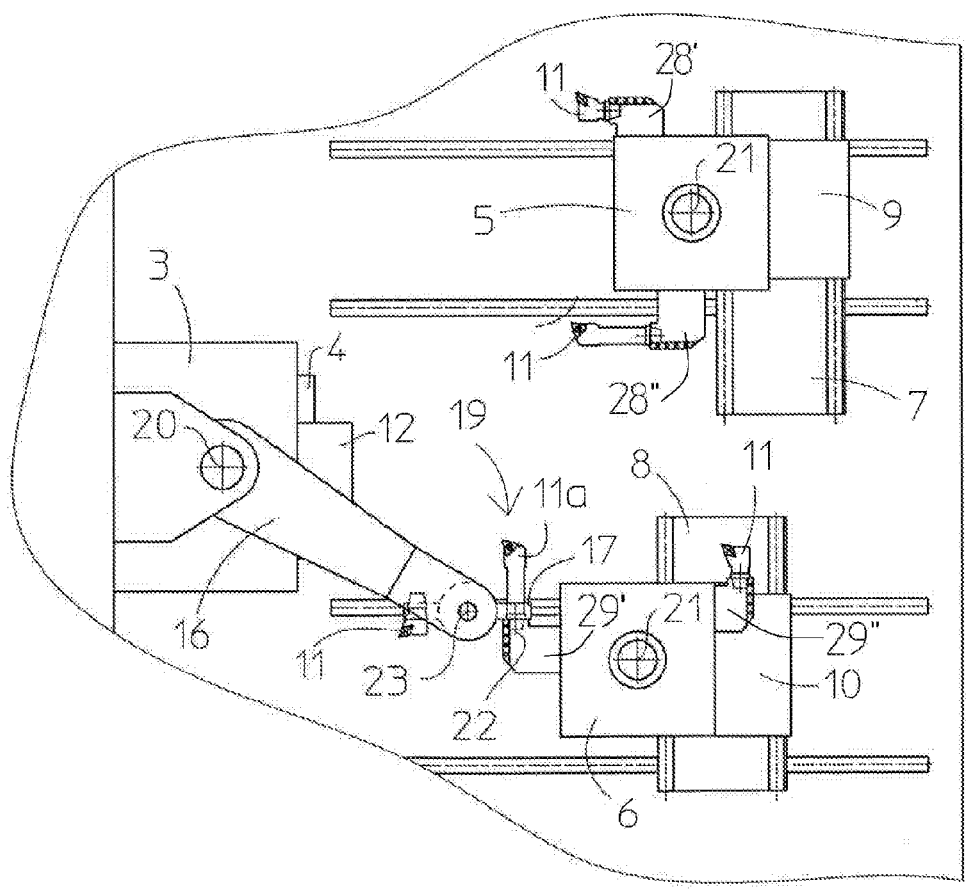
FIGS. 2 and 3 are detail views showing the machine in two different tool-changing positions.

The machine described above operates as follows to change tools:

As shown in FIG. 2 the tool 11*a* is shifted by appropriate horizontal and vertical movement of the tool holder 6 into the transfer position 19. Simultaneously an axis 22 of the tool 11*a* is oriented vertically by rotation of the holder 6 about its axis 21 (FIG. 2).

Meanwhile (FIG. 2) the transfer arm 16, which has picked up a tool 11 from the loader grab 15, is rotated about its axis 20 so that the empty half of its double grab 17 can grip the tool 11*a* in the chuck 29'. The chuck 29', under control of the controller 27, then releases the tool 11*a* and the holder 6 drops enough to clear it, then the double grab 17 rotates through 180° to align the replacement tool in the other side of its double grab 17 with the now empty socket 29' in the holder 6, and the holder 6 rises back up by movement of the slide 10 up on the slide 8, and the replacement tool is fitted into the chuck 29' of the holder 6.

Figure 3:
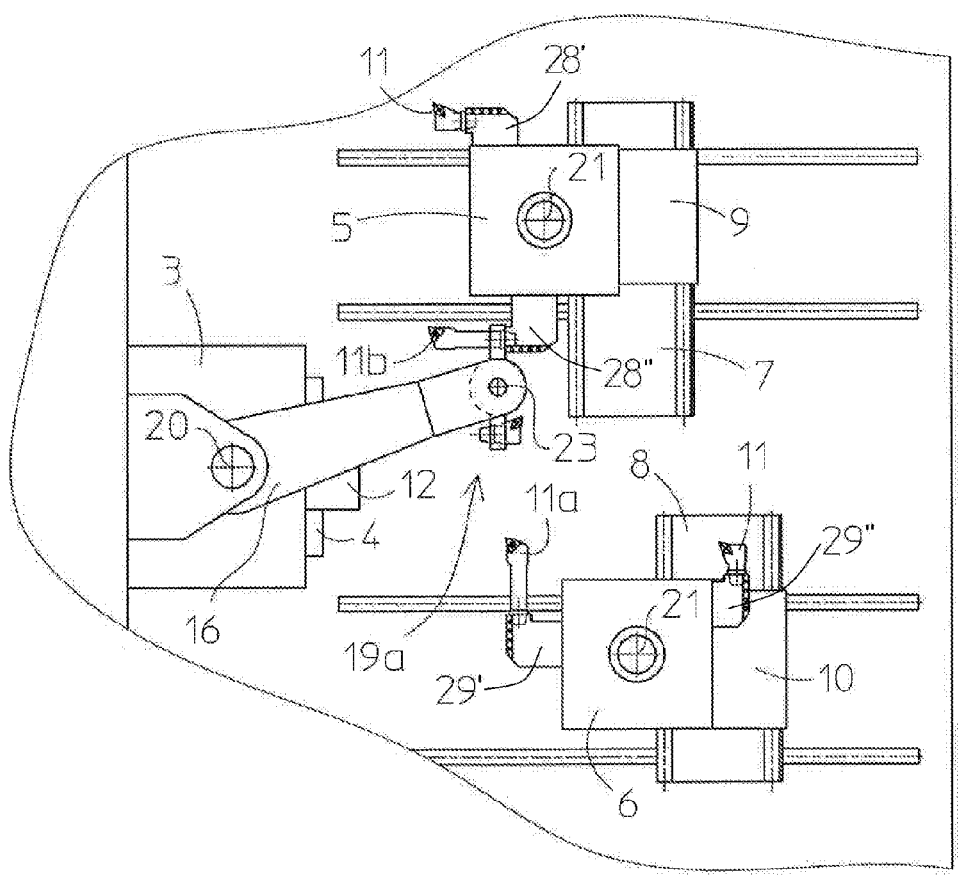

As shown in FIG. 3 the holder 5 moves horizontally and vertically and about its axis 21 to position the tool 11*b* with its axis 22 horizontal in the transfer station 19*a*. The tool 11*b* would then be switched as in FIG. 2, but with horizontal shifting of the holder 5 on its slide 9 to pull the tool 11*b* out of its chuck 28" and then set a new tool 11 therein. (FIGS. 10-13).

Either holder 5 or 6 as shown in FIGS. 4 and 5 can orient its tools vertically or horizontally in the respective stations 19 and 19*a* and the double grab 17 on the end of the arm 16 can similarly be oriented either vertical or horizontal as needed.

A tool 11, 11*a*, or 11*b* taken out of one of the holders 5 and 6 can be transferred to the other holder 5 or 6 or can be moved back to the loader 14 to be put back into the magazine 13, as needed.

I claim:

1. A method of operating a machining apparatus having:
    a frame;
    a magazine holding a plurality of tools;
    a loader capable of moving the tools between the magazine and a primary transfer position;
    a chuck on the frame, adapted to hold a workpiece, and rotatable on the frame about a workpiece axis;
    a drive spindle for rotating the chuck about the workpiece axis;
    first and second tool holders each displaceable relative to one another horizontally and vertically on the frame; and
    a transfer arm carrying a grab,
    the method comprising the steps of sequentially:
    a) supporting each of the tool holders for movement into and out of a respective secondary transfer position at which the arm can transfer a tool to or from the respective tool holder;
    b) removing one of the tools from the magazine with the loader and moving the one tool by the loader into the primary transfer position;
    c) transferring the one tool in the primary transfer position to the grab of the transfer arm;
    d) pivoting the arm to move the one tool in the grab from the primary transfer position into one of the secondary transfer positions; and
    e) transferring the tool at the one secondary transfer position from the grab to the respective holder.

2. The method defined in claim 1, wherein the grab of the arm is a double grab shiftable on an outer end of the arm.

3. The method defined in claim 2, wherein in step c) the one tool is transferred to one set of grippers of the double grab and an other set of grippers of the double grab is left empty, the method further comprising between steps d) and e) the steps of:
    $d_1$) gripping a tool in the holder in the one secondary transfer position with the empty other set of grippers;
    $d_2$) releasing the gripped tool from the holder in the one secondary transfer position;
    $d_3$) shifting the holder in the one secondary transfer position away from the gripped tool;
    $d_4$) moving the double grab to move the other set of grippers and the gripped tool out of the one secondary position and to move the one set of grippers with the one tool into alignment with the holder in the one secondary transfer position;
    $d_5$) shifting the holder in the one secondary transfer position toward the one tool held by the one set of grippers to fit the one tool to the holder of the one secondary transfer position;
    $d_6$) gripping the one tool with the holder of the one secondary transfer position; and
    $d_7$) releasing the one tool from the one set of grippers.

4. The method defined in claim 3, wherein in step $d_4$ the double grab is pivoted about an axis on a free end of the arm.

5. The method defined in claim 3, further comprising after step e) the step of:
    f) transferring the tool in the one set of grippers to the loader for return to the magazine.

6. A machining apparatus comprising:
a frame;
a magazine holding a plurality of tools;
a chuck adapted to hold a workpiece and rotatable on the frame about a workpiece axis;
a drive spindle for rotating the chuck about the workpiece axis;
a loader capable of moving the tools between the magazine and a primary transfer position;
first and second tool holders each displaceable relative to one another horizontally and vertically on the frame into and out of a respective secondary transfer position;
a transfer arm carrying a grab and configured to transfer, at the secondary transfer positions, a tool to or from the respective tool holder,
control means connected to the loader, first and second tool holders, and transfer arm for:
a) removing one of the tools from the magazine with the loader and moving the one tool with the loader into the primary transfer position;
b) transferring the one tool in the primary transfer position to the grab of the transfer arm;
c) pivoting the arm to move the one tool in the grab from the primary transfer position into one of the secondary transfer positions; and
d) transferring the tool at the one secondary transfer position from the grab to the respective holder.

7. The machining apparatus defined in claim 6, wherein during the transfer of the tool at the one secondary transfer station from the grab to the respective holder, the respective holder is moved horizontally or vertically toward and away from the grab.

8. The machining apparatus defined in claim 6, wherein the secondary positions of the first and second holders are offset from each other.

* * * * *